Figure 1:
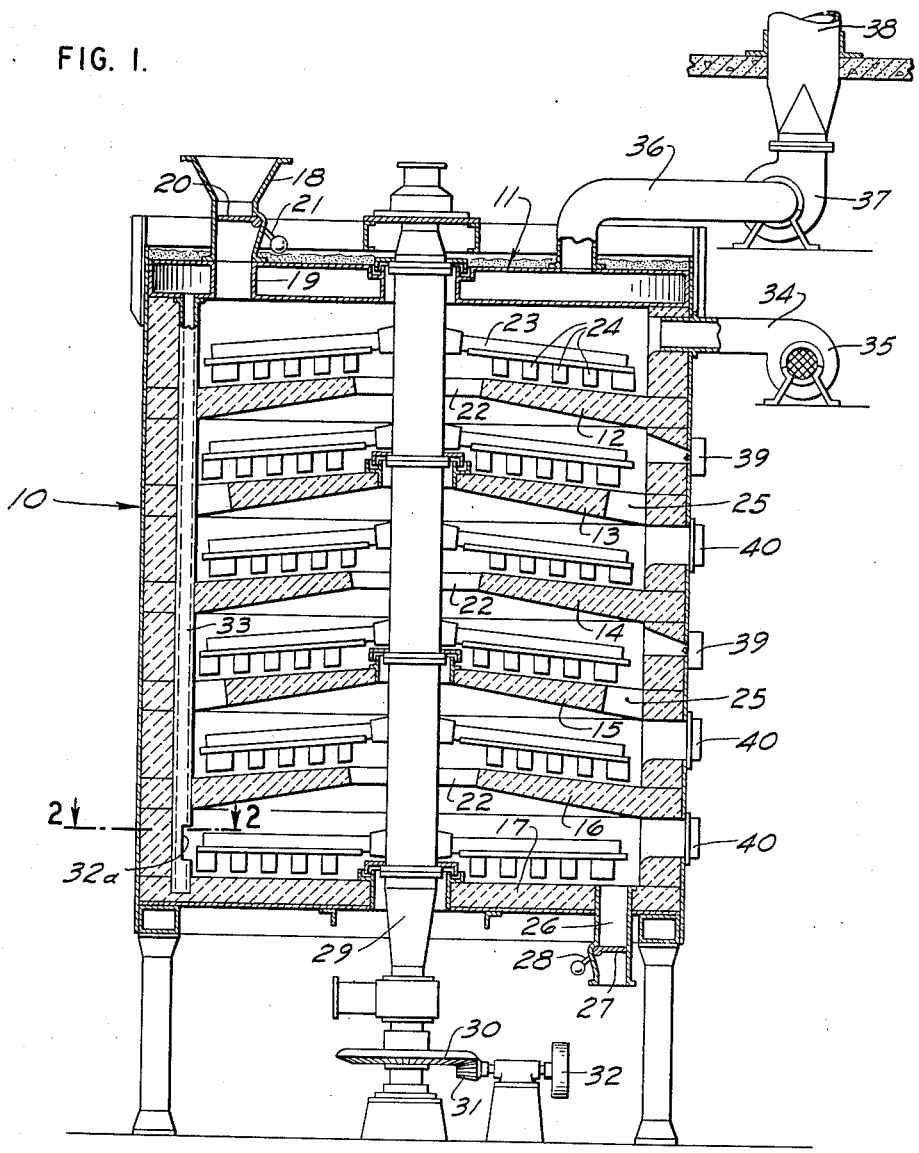

July 5, 1938.   W. RAISCH   2,122,491

INCINERATION

Filed Nov. 2, 1936

INVENTOR.
WILLIAM RAISCH
BY Louis L. Amart
his ATTORNEY.

Patented July 5, 1938

2,122,491

UNITED STATES PATENT OFFICE 2,122,491

INCINERATION

William Raisch, New York, N. Y., assignor to Underpinning & Foundation Co., Inc., New York, N. Y., a corporation of New York Application November 2, 1936, Serial No. 108,715

9 Claims. (Cl. 110—8)

The present invention relates to incineration and more particularly to improvements in apparatus of the multiple-hearth type of furnace adapted for carrying out a process involving one or more preliminary or drying stages in which moisture and volatile constituents are driven off from the material to be treated as by subjecting the material to heating and contact with a stream of air, preferably preheated, and one or more stages in which the dried material is completely burned. The apparatus may be used for drying purposes only.

The principal objects of the invention are to provide novel, advantageous and efficient forms of apparatus for effecting treatment of the general character specified. Heretofore, I proposed to provide apparatus in which preheating of the air for drying purposes may be carried out within the furnace itself. It is another object of the invention to provide improved apparatus for preheating air within the furnace itself.

While applicable to the treatment of various materials, the present invention is particularly adapted for the disposal and destruction of waste materials, such as garbage and sewage solids in the form of sludge or in the form of screenings having high moisture content.

In carrying out the invention use may be made of a vertical furnace of the tiered multiple-hearth type comprising vertically spaced hearths separating the furnace into compartments or zones and provided with outlets at the center of one hearth and at the periphery of the next adjoining hearth either above or below, the lowermost hearth preferably having a peripheral outlet through which the ash may be discharged from the furnace.

Preheating of the air within the furnace itself may be effected in a suitable manner as by the use of ducts separated from the interior of the furnace by heat conducting material and arranged at the interior surface of the peripheral wall as well as extending from the bottom of the furnace, where hot combustion gases are received, to the top of the furnace where hot gases are discharged into a hollow furnace top and then to a stack. The bottom of the hollow top is of heat conducting material and provides heat exchange between the hot gases and air supplied to the uppermost compartment of the furnace. The air thus preheated is passed downwardly through the furnace concurrently with the direction of flow of material to be dried and burned, and the resulting gases of combustion pass upwardly through the ducts at the inner surface of the furnace to the hollow top and then to the stack. With this arrangement, the hot gases passing upwardly through the ducts at the inner surface of the peripheral wall serve to keep the air and gases in the various compartments at a higher temperature, and in passing through the hollow top serve to preheat to a substantial extent fresh air in the uppermost compartment as soon as it enters the compartment.

Burners may be used in connection with the various compartments to enable regulation of the temperatures in such compartments so that if noxious odors are produced by treatment in the drying zones, the temperature in the lower burning zones will be sufficient to eliminate such odors.

Figure 2:
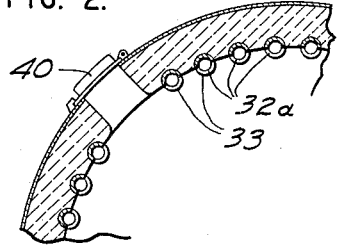

Other objects, features and advantages will appear upon consideration of the following description and of the drawing in which:

Fig. 1 is a vertical section of the furnace embodying the present invention in a preferred form; and Fig. 2 is a section on a line 2—2 of Fig. 1.

Referring to the drawing, the invention may be embodied in a furnace 10 provided with a top 11 and hearths 12, 13, 14, 15, 16 and 17, of which the hearth 17 serves as a bottom of the furnace or furnace chamber.

The material to be treated may be introduced into the furnace and deposited upon the uppermost hearth 12 through a hopper 18 and a chute 19 extending through the top 11 of the furnace and provided with a pivoted door or gate 20 normally held closed by suitable means such as a weighted arm 21. As soon as a sufficient amount of material to overcome the action of the weighted arm 21 collects on the door or gate 20, the door swings downwardly about its pivotal support and permits the material on the door to fall to the hearth 12.

As illustrated, this material falls on the hearth 12 near its periphery and is worked inwardly to a central discharge opening 22 by suitable rabbling means including one or more radial arms 23 and inclined blades 24. Below the hearth 12, the hearths 13 and 15 are provided with peripheral outlets 25, the hearths 14 and 16 are provided with central outlets 22 corresponding with the central outlet of the hearth 12, and the lower hearth 17 is provided with a single outlet or chute 26 through which the ash is discharged from the furnace. The chute 26 is preferably provided with a gas seal in the form of a pivoted door 27 normally held in closed position by a weighted arm 28. The material on the hearths 13, 14, 15, 16 and 17 is moved towards the corresponding outlets by suitable rabbling means similar to that used above the hearth 12, the blades 28 above the hearths 13, 15 and 17 being so inclined as to carry the material outwardly to the peripheral outlets thereof, and the blades above the hearths 14 and 16 being so inclined as to work the material toward the central opening as in the case of hearth 12.

The rabbling arms 23 are supported and operated by a hollow vertical shaft 29 passing through the central parts of the central outlets 22 of the hearth 12, 14 and 16 and through small openings in the top 11 and the hearths 13, 15 and 17, suitable gas seals being provided where the shaft 29 passes through the top and these hearths. The shaft 29 may be rotated in any suitable manner as by means of a bevel gear 30, a bevel gear 31 meshing with the bevel gear 30, and a pulley 32 connected with the bevel gear 31 and being driven from any suitable source of power.

Preheating of the air introduced into the upper compartment of the furnace may be effected by use of a down draft and passing the hot gases from the bottom of the furnace into elongated openings 32a at the lower ends of a plurality of upright ducts 33 arranged around the furnace at the inner surface of its lateral wall and discharging the hot gases into the hollow top 11 which may be of suitable heat resisting material such as metal. The air supplied to the upper part of the furnace through a duct 34 and fan 35 is passed downwardly through the various compartments, concurrently with the solids or solid material being treated, until the lowermost compartment is reached. There the hot gases of combustion enter the tubes 33, pass into the hollow furnace top 11 from which they pass through a duct 36 and a fan 37 to a stack 38.

The dried material fed to the lower compartments may be sufficient to keep the fire going, but in many cases it is desirable to produce higher temperatures than would be obtained in this way. For this purpose and also for use in starting the furnace, the furnace may be supplied at suitable points with burners 39. It may also be desirable to provide doors 40 at suitable points to give access to the interior of the furnace. Where burners 39 and doors 40 are located, it will be necessary to omit vertical ducts 33. For that reason care should be taken in locating such burners and doors.

In operation, the solid material to be treated is deposited on the hearth 12 in the uppermost compartment and is gradually fed back and forth on successive hearths until, in the form of ash, it reaches the lowermost zone and is discharged from the furnace. At the same time air is supplied to the upper compartment of the furnace and caused to flow downwardly, or concurrently with the solids under treatment. The hot combustion gases are discharged from the upper ends of the ducts 33 into the hollow furnace top 11 to heat the air entering the uppermost compartment. After use for this purpose the hot gases are discharged into the atmosphere.

It should be understood that various changes may be made and that various features may be used without others without departing from the true scope and spirit of the invention.

Having thus described my invention, I claim:

1. The combination with a multiple-hearth furnace having a peripheral wall, a hollow top with a bottom adapted for heat exchange, a plurality of hearths cooperating with said top to divide the interior of the furnace into compartments and means for supplying outside air to the uppermost compartment, of means for conducting hot combustion gases from the lower part of the furnace upwardly at the inner surface of said peripheral wall in heat exchanging relation with the interior of the furnace and into said hollow top, and means for discharging the combustion gases from said hollow top.

2. The combination with a multiple-hearth furnace having a peripheral wall, a hollow top with a bottom adapted for heat exchange, a plurality of hearths cooperating with said top to divide the interior of the furnace into compartments and means for supplying outside air to the uppermost compartment, of a plurality of ducts for conducting hot combustion gases from the lower part of the furnace upwardly at the inner surface of said peripheral wall in heat exchanging relation with the interior of the furnace and into said hollow top, and means for discharging the combustion gases from said hollow top.

3. The combination with a multiple-hearth furnace having a peripheral wall, a hollow top with a bottom adapted for heat exchange, a plurality of hearths cooperating with said top to divide the interior of the furnace into compartments and means for supplying outside air to the uppermost compartments, of means for conducting hot combustion gases from the lower part of the furnace upwardly at the inner surface of said peripheral wall in heat exchanging relation with the interior of the furnace and into said hollow top, such conducting means comprising tubes of heat-resisting metal extending from the lowermost hearth to the hollow top and having side openings communicating with the compartment above said lowermost hearth, and means for discharging the combustion gases from said hollow top.

4. The combination with a multiple-hearth furnace having a peripheral wall, a hollow top with a bottom adapted for heat exchange, a plurality of hearths cooperating with said top to divide the interior of the furnace into compartments and means for supplying outside air to the uppermost compartment, of means for conducting hot combustion gases from the lower part of the furnace upwardly at the inner surface of said peripheral wall in heat exchanging relation with the interior of the furnace and into said hollow top, and means for discharging the combustion gases from said hollow top, such gas-conducting means comprising tubes of heat-resisting metal having their lower ends in engagement with one of said hearths and their upper ends communicating with the interior of said hollow top, said tubes having lateral openings communicating with one of said compartments.

5. The combination with a multiple-hearth furnace having a peripheral wall, a top, a plurality of hearths cooperating with said top to divide the interior of the furnace into compartments and means for supplying outside air to the uppermost compartment, of a heat-exchanger at the top of the uppermost compartment, ducts for conducting hot combustion gases from the lower part of the furnace upwardly at the inner surface of said peripheral wall in heat exchanging relation with the interior of the furnace and into said heat exchanger, and means for discharging gases from said heat exchanger.

6. The combination with a multiple-hearth furnace having a peripheral wall, a hollow top with a bottom adapted for heat exchange, a plurality of hearths cooperating with said top to divide the interior of the furnace into compartments and means for supplying outside air to the uppermost compartment, of means for conducting hot combustion gases from the lower part of the furnace upwardly at the inner surface of said peripheral wall in heat exchanging relation with the interior of the furnace and into said hollow top, such gas-conducting means including a plurality of tubes partially embedded in said peripheral wall, and means for discharging the combustion gases from said hollow top.

7. The combination with a multiple-hearth furnace having a peripheral wall, a hollow top with a bottom adapted for heat exchange, a plurality of hearths cooperating with said top to divide the interior of the furnace into compartments, the lowermost hearth having a peripheral outlet and the next higher hearth having a central outlet, and means for supplying outside air to the uppermost compartment, of a plurality of tubes communicating at their upper ends with said hollow top and extending downwardly to the lowermost compartment where they are provided with inlets whereby hot gases are passed upwardly from said lowermost compartment in heat-interchange relation with the interior of the furnace and into said hollow top, and means for discharging the combustion gases from said hollow top.

8. The combination with a down-draft multiple-hearth furnace having a peripheral wall, hearths dividing the furnace into compartments, the material being fed downwardly from hearth to hearth, and means for supplying air to the uppermost compartment, of means for conducting hot combustion gases from the lower part of the furnace upwardly at the inner surface of said peripheral wall in heat exchanging relation with the interior of the furnace, and means for receiving the hot gases conducted upwardly at the inner surface of said wall, passing them across the uppermost compartment in heat exchanging relationship with the air in said compartment, and discharging said hot gases at lower temperature from the furnace.

9. The combination with a down-draft multiple-hearth furnace having a peripheral wall, hearths dividing the furnace into compartments, the material being fed downwardly from hearth to hearth, and means for supplying air to an upper compartment, of means for conducting hot combustion gases from the lower part of the furnace upwardly at the inner surface of said peripheral wall in heat exchanging relation with the interior of the furnace, and means for receiving the hot gases conducted upwardly at the inner surface of said wall, passing them across said upper compartment in heat exchanging relationship with the air in said compartment, and discharging said hot gases at lower temperature from the furnace.

WILLIAM RAISCH.